Aug. 15, 1939.   F. J. JARVIS   2,169,801
MANUFACTURE OF PATTERNED FABRICS ON CIRCULAR KNITTING MACHINES
WHICH ARE ADAPTED TO PRODUCE INTERLOCK FABRICS
Filed May 21, 1937   3 Sheets-Sheet 1

Aug. 15, 1939.  F. J. JARVIS  2,169,801
MANUFACTURE OF PATTERNED FABRICS ON CIRCULAR KNITTING MACHINES
WHICH ARE ADAPTED TO PRODUCE INTERLOCK FABRICS
Filed May 21, 1937  3 Sheets-Sheet 2

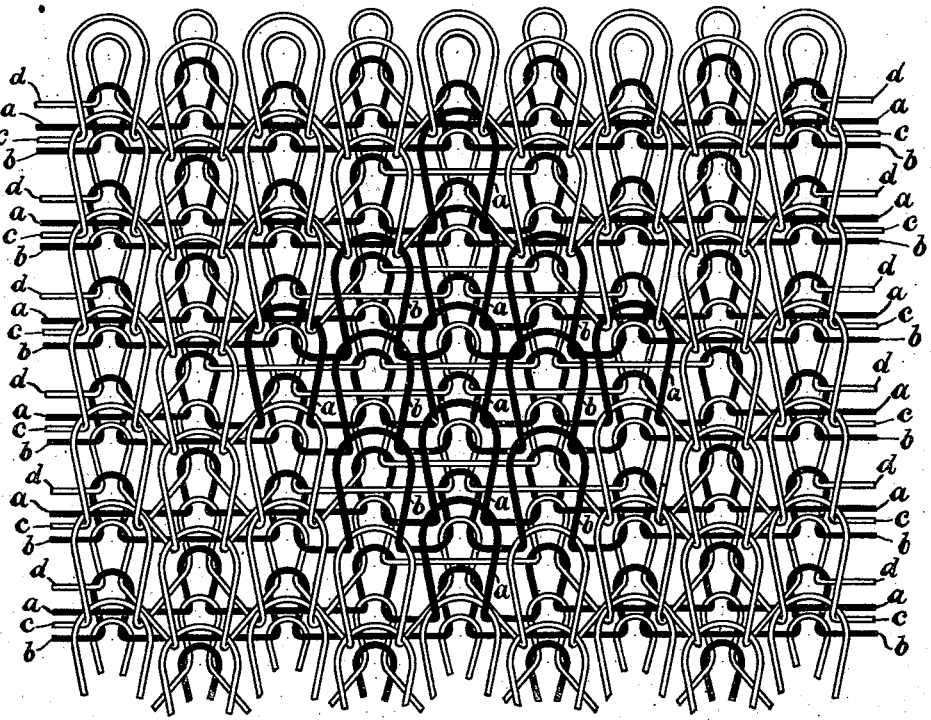

Fig. 3.

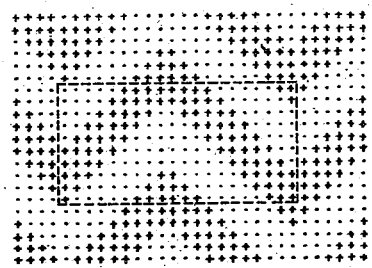

Fig. 4.

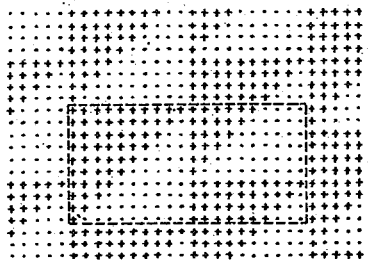

Fig. 6.

Fig. 5.
```
cdcdcbababababadcacdab
cdcdababababcdcdcb
cdcbababcdababadcdcd
cdababadcdcbababcdcd
cbababcdcdcdababadcd
ababadcdcdcdcbababcd
ababadcdcdcdcbababcd
abadcdcdababcdcdcbabab
abcdcdcababababcdcdcbab
adcdcdababababcdcdcbab
```

Fig. 7.
```
abababababababababcdcd
ababababababadababadcdcd
ababababcdababcdcdcd
ababadababcdababadcdcd
ababababcdcdababcdcdcd
ababababcdcdababcdcdcd
ababcdcdcdababababab
abcdcdcdcdababababab
abcdcdcdcdababababcd
adcdcdcdcdababababadcd
```

Inventor:
Frank James Jarvis
By: Mason & Porter
Attorneys

Aug. 15, 1939.  F. J. JARVIS  2,169,801
MANUFACTURE OF PATTERNED FABRICS ON CIRCULAR KNITTING MACHINES
WHICH ARE ADAPTED TO PRODUCE INTERLOCK FABRICS
Filed May 21, 1937   3 Sheets-Sheet 3

INVENTOR
Frank James Jarvis
By Mason + Porter
ATTORNEYS

Patented Aug. 15, 1939

2,169,801

UNITED STATES PATENT OFFICE 2,169,801

MANUFACTURE OF PATTERNED FABRICS ON CIRCULAR KNITTING MACHINES WHICH ARE ADAPTED TO PRODUCE INTERLOCK FABRICS

Frank James Jarvis, Nottingham, England, assignor to George Blackburn and Sons Limited, Nottingham, England Application May 21, 1937, Serial No. 144,072
In Great Britain May 28, 1936

4 Claims. (Cl. 66—197)

This invention relates to improvements in the manufacture of pattern fabrics on circular knitting machines which are adapted to produce interlock fabrics, and in means therefor, and its object is to produce on such machines fabrics which are similar to and have very much the same characteristics as ordinary plain interlock fabrics, but are made with a pattern in either colours or tuckwork, or a combination of both colours and tuckwork.

Interlock fabrics are made on a circular rib knitting machine on which the rib needles register with the cylinder needles and alternate cylinder needles and alternate rib needles knit a thread supplied by one feeder, while the remaining cylinder needles and the remaining rib needles knit a second thread which is supplied by the next following feeder. Each course thus consists of two threads, one of which is knitted as a one and one rib on half the cylinder and rib needles, and the other thread is knitted in a similar manner on the remaining cylinder and rib needles, and it thus takes two feeders to knit a complete course. We are aware that coloured patterned fabrics have been produced on such machines, but the patterns have hitherto only appeared in alternate needle wales in such fabrics, and our object is to overcome this defect.

According to this invention, pattern fabrics are produced on machines of this type with four or a multiple of four feeders either in colours or tuck work, or a combination of both these features, by providing cylinder needle selecting mechanism in connection with each feeder, and knitting alternate cylinder needle wales in the pattern area in one thread at one feeder, and the remainder in another thread at another feeder, alternate cylinder needle wales in the ground are knitted in a third thread at another feeder and the remainder in a fourth thread at another feeder, while alternate threads in the four which form the patterned face are knitted on alternate rib needles and the remaining thread on the remaining rib needles and twice as many courses are thus in the rib needle wales as in the cylinder needle wales.

The needle selecting mechanism at alternate feeders are further arranged to make a selection from alternate cylinder needles, while those at the remaining feeders are arranged to make a selection from the remaining cylinder needles. This arrangement is necessary because in this class of machine alternate needles can only be employed to knit at alternate feeders and the remaining needles at the remaining feeders. This also applies to the rib needles and is the reason why difficulty is experienced in producing satisfactory patterned fabrics.

Coloured pattern fabrics are in the present case produced by utilizing four successive feeders to knit a course, and controlling the cylinder needles at each of these four feeders by means of the needle selecting mechanism at each feeder. Fabrics with tuckwork patterns are produced by employing pattern wheels at some of the feeders which are adapted to raise the selected needles or a certain proportion of them into a tuck position. With the system described we are able to produce patterned fabrics in colours or in tuckwork or in both colours and tuckwork which are free from defects, the patterns in colour being on one face only in which the ground is when desired one distinct colour, and the pattern or the objects which constitute the pattern in another distinct colour.

Patterns in three or four colours may however be produced, but in this case the colours appear in alternate needle wales in both the ground and the pattern, or in alternate needle wales in either the ground or the pattern.

The invention will now be more particularly described with reference to the accompanying drawings, in which Fig. 1 is an elevation showing one of the cylinder needle selecting devices in connection with part of an interlock fabric knitting machine adapted to produce a patterned fabric according to the invention.

Fig. 3 is a diagram showing the disposition of the threads in a pattern fabric made according to the invention.

Fig. 4 is a draft of a pattern, and

Fig. 5 is a key which indicates which threads form the cylinder needle loops in the pattern and those in the ground.

Fig. 6 is a draft of a further pattern, and

Fig. 7 is a key which indicates which threads form the cylinder needle loops in this pattern and those in the ground.

Like letters indicate like parts throughout the drawings.

In carrying out this invention, needle selecting mechanism is provided in connection with each feeder, which in its simplest form, consists of a pattern wheel A (see Fig. 1) with bits A¹ distributed round its periphery which are adapted to engage with the butts of the cylinder needles D and select and raise a certain predetermined proportion of them into a clearing or tuck position, while the remainder remain out of action. Either of two kinds of bits A¹ are employed in the pattern wheels A according to the class of work that is to be produced, that is, clearing bits which raise the needles into a clearing position, and tuck bits which raise the needles into a tuck position. These bits A¹ are only disposed in the wheel A where required, and it will be understood that the clearing bits raise the needles high enough to clear their loops, while the tuck bits raise the needles high enough to take the new thread but not high enough to clear their old loops. The bits A¹ are detachable and are arranged in the wheel in the order required to produce any given pattern.

Figure 1:
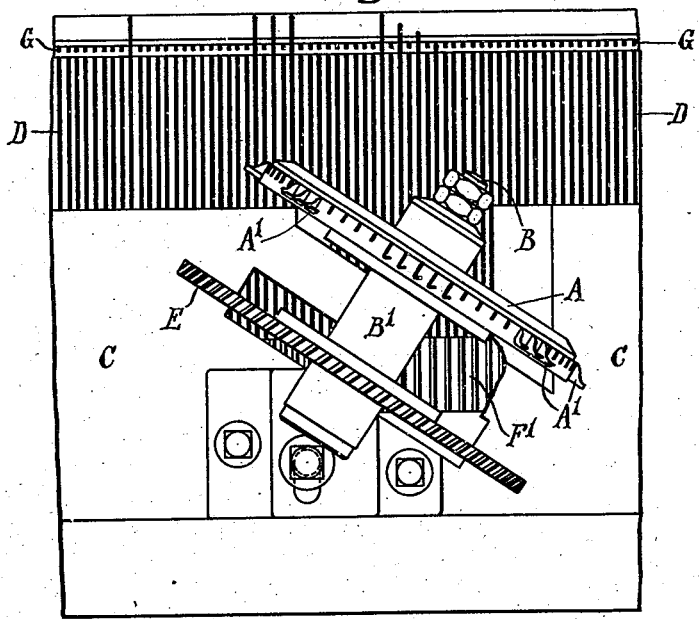
Figure 2:
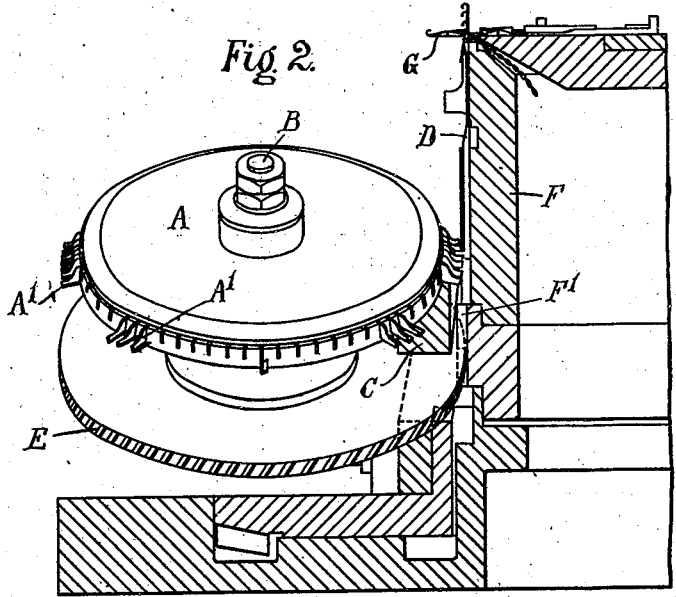
Fig. 2 is a vertical section of the machine taken at a point where one of the pattern wheels is disposed.
Figure 8:
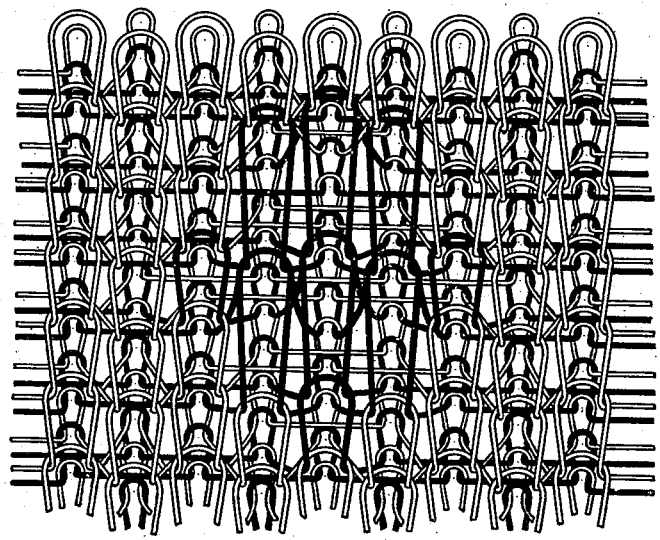
Figure 8 shows a fabric having a design in colour and showing tuck stitches.
Figure 9:
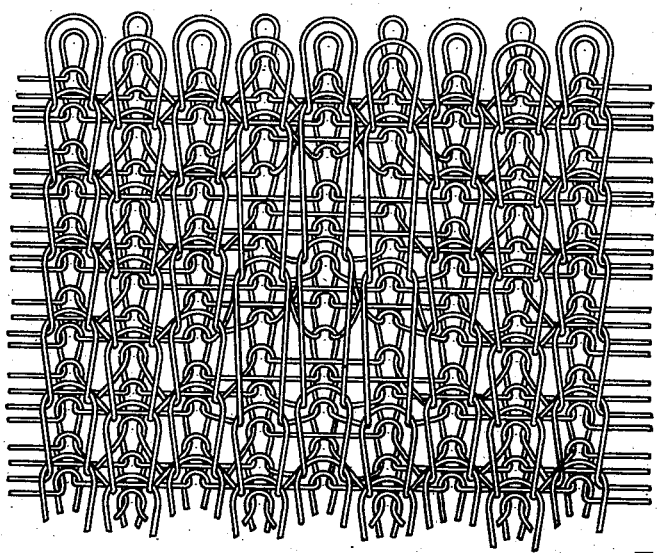
Figure 9 shows a fabric in a single colour and showing tuck stitches.

Each pattern wheel A is as shown in Fig. 1, secured on an axle B which is mounted in a bearing B¹ secured to the rotating cam ring or case C, and provision is made for raising and lowering this bearing so that the height of pattern wheel A can be adjusted relatively to the cylinder needles D. The axle B is provided in addition to the pattern wheel A with a toothed gear wheel E which gears with a toothed ring F¹ on the needle cylinder F, so that the bits A¹ in the pattern wheel A cannot get out of gear with the butts of the needles D. If desired means of the micrometer type is provided for angularly adjusting the pattern wheel A on the axle B relatively to the toothed gear wheel E on the same axle.

In colour work, the pattern wheels A associated with the first and second feeders of a machine with four feeders, are arranged to select and raise the cylinder needles D which are to produce the pattern on the face of the fabric, while the pattern wheels A associated with the following third and fourth feeders are arranged to raise the remaining needles D, which are to produce the ground, alternate needle wales in the pattern being knitted at the first feeder and the remainder at the second feeder, while alternate needle wales in the ground are knitted at the third feeder and the remainder at the fourth feeder.

This will be best understood by reference to Fig. 3 which is a diagram showing on a greatly enlarged scale, the disposition of the four threads in a patterned fabric produced according to this invention. In this diagram the thread knitted on the cylinder needles D at the first feeder is marked a, that knitted at the second feeder is marked b, that knitted at the third feeder is marked c and that knitted at the fourth feeder is marked d. In this diagram, the cylinder needle loops formed by the threads a and b only are indicated by the corresponding letters a and b.

In the pattern drafts shown in Figs. 4 and 6, the cylinder needle loops in the pattern are indicated by crosses, and those in the ground by dots, and the part enclosed in the dotted rectangle constitutes a repeat of the pattern. Below each of these Figs. 4 and 6 is a key in which letters are substituted for the crosses and dots in Figs. 4 and 6 and these letters indicate which of the four threads a b c or d form each loop in the repeat in the dotted rectangle.

A fabric with a ground of one colour with a pattern area of another colour is produced by knitting threads a and b both of the same colour on the needles selected at the first and second of the four feeders previously referred to, with the result that the loops formed by threads a and b will be of the same colour while threads c and d of another colour will be knitted at the third and fourth feeders, with the result that the loops formed by the threads c and d will all be of the same colour, and assuming that the yarns a and b knitted at the first and second feeders is red, the pattern will be red, while if the threads c and d knitted at the third and fourth feeders is black, a black ground will be produced.

Four different coloured yarns may be employed in some cases, but the results are not so distinct as those obtained by the use of two colours as previously described. For example, assuming a red yarn a is supplied to the needles at the first feeder, a white b at the second, a black c at the third and a green d at the fourth, the following would be the result. Alternate cylinder needle wales in the pattern would be red, and the remainder white, while alternate cylinder needle wales in the ground would be black and the remainder would be green.

It is also possible to produce a fabric in which two colours appear in the pattern areas and one in the ground, by supplying different coloured threads a and b to the needles at feeders 1 and 2 and the same coloured threads c and d at feeders three and four. Or alternatively a fabric with two colours in the ground and one in the pattern can be produced by supplying different coloured threads c and d to the needles at feeders 3 and 4, and the same coloured threads a and b to the needles at feeders 1 and 2.

The rib needles G knit at the four feeders described in the usual order, that is, alternate needles knit at the first feeder and the remainder at the second feeder, and this is repeated at the third and fourth feeders, so that two courses are knitted on these rib needles G to one on the cylinder needles D, and consequently the patterned front of the fabric which is formed by the cylinder needle wales, is composed of only half the number of courses as the back of the fabric, which is composed of the rib needle wales. The patterned front of the fabric is thus superimposed on a backing which is of a much closer and stiffer nature than the front and is not patterned.

In a machine with eight feeders, similar courses to those knitted on feeders one to four can be knitted on feeders five to eight, and in this case alternate courses are knitted on feeders one to four and the remaining courses on feeders five to eight. With eight feeders therefore two patterned courses will be knitted on the cylinder needles D, and four plain courses on the rib needles G every revolution of the cam ring or case C.

Patterns in tuckwork are produced by employing tuck bits in place of some of the clearing bits in a certain proportion of the pattern wheels employed, say for example at the feeders five to eight, so that the needles selected at these feeders for producing the pattern retain their loops until they knit at feeders one to four again.

When the threads supplied to the needles in this case are all of the same colour, the pattern will be produced in tuckwork and the ground will be plain, and when different coloured threads are supplied to the needles, the pattern will be in both colours and tuckwork.

It will also be appreciated that the reverse effect may be obtained, that is, the tuckwork may be produced in the ground instead of in the pattern and that in this case the latter will be plain.

It must also be understood that any two of a series of four feeders may be adapted to produce the pattern and the remainder to produce the ground, and that other well known forms of cylinder needle selecting means may be employed in place of that described and shown.

What I claim is:

1. A rib knitted fabric of the interlock type with a patterned surface in which alternate plain wales in the patterned areas are composed of one thread and the remaining wales in said areas of a second thread, and alternate plain wales in the ground are composed of a third thread and the remaining wales in the ground of a fourth thread, while alternate rib wales are composed of threads one and three, and the remaining rib wales are composed of threads two and four, twice as many loops being thus knitted in the rib wales as in the plain wales, substantially as described.

2. A rib knitted fabric of the interlock type with a patterned surface in which alternate plain wales in the patterned areas are composed of one thread and the remaining wales of a second thread, and alternate plain wales in the ground are composed of a third thread and the remaining wales of a fourth thread, and threads one and two which form the plain wales in the pattern are of a different colour to the threads three and four which form the plain wales in the ground, and alternate rib wales are composed of threads one and three and the remainder of threads two and four, substantially as described.

3. A rib knitted fabric of the interlock type with a patterned surface in which alternate plain wales in the patterned areas are composed of one thread and the remaining wales of a second thread, and alternate plain wales in the ground are composed of a third thread and the remaining wales of a fourth thread while threads one and three are embodied in alternate rib wales and threads two and four in the remainder, and the loops in the plain wales in the pattern areas are tucked, substantially as described.

4. A rib knitted fabric of the interlock type with a patterned surface, in which alternate plain wales in the patterned areas are composed of one thread and the remaining wales of a second thread, and alternate plain wales in the ground are composed of a third thread and the remaining wales of a fourth thread while threads one and three are embodied in alternate rib wales and threads two and four in the remainder and the loops in the plain wales in the ground areas are tucked, substantially as described.

FRANK JAMES JARVIS.